May 3, 1949.　　　　J. D. SASSER　　　　2,468,945
ALTITUDE RESPONSIVE CONTROL AND SIGNAL DEVICE
Filed July 21, 1944　　　　　　　　　　2 Sheets-Sheet 1
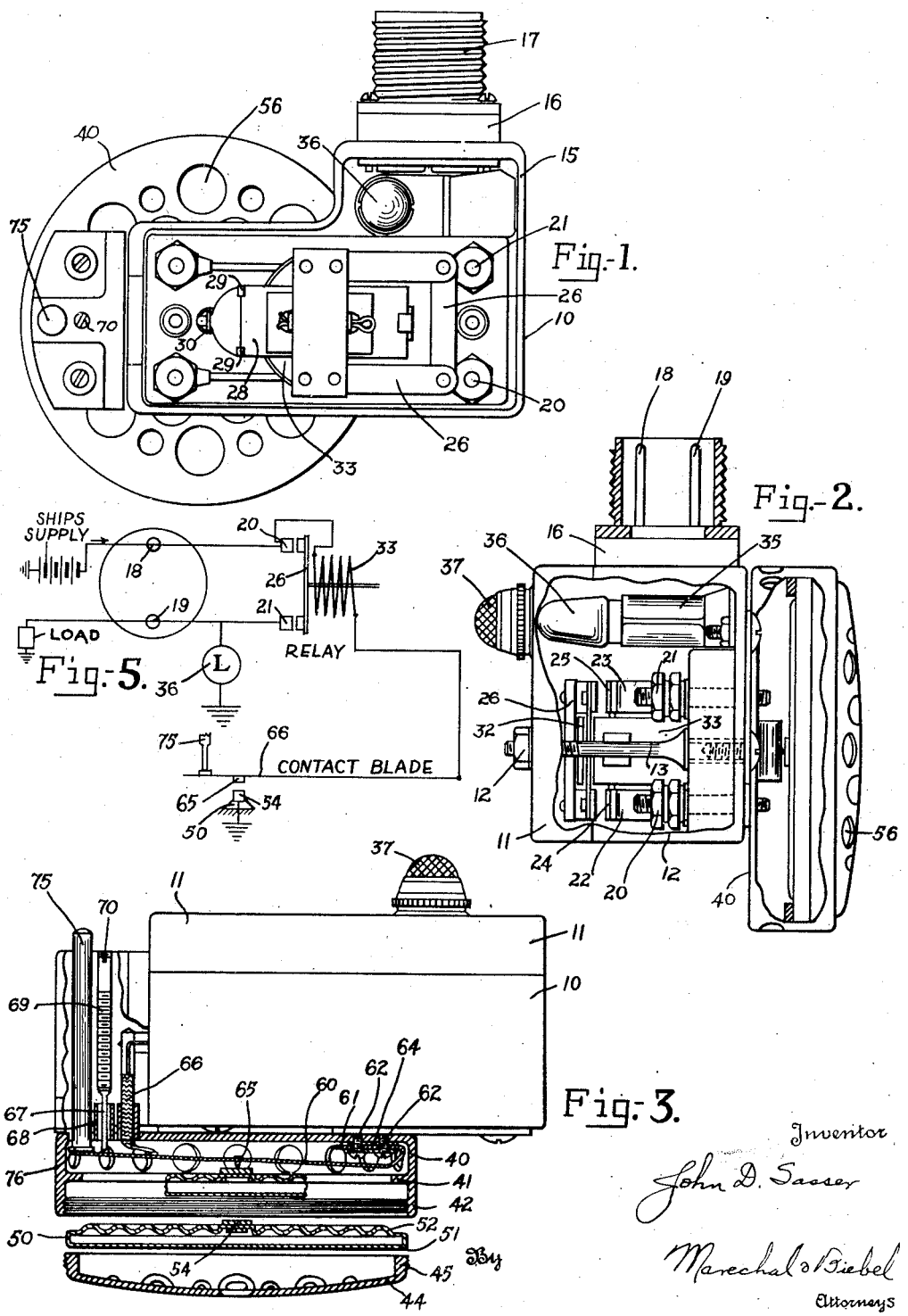

May 3, 1949.   J. D. SASSER   2,468,945
ALTITUDE RESPONSIVE CONTROL AND SIGNAL DEVICE
Filed July 21, 1944   2 Sheets-Sheet 2

Inventor
John D Sasser
By
Marechal & Biebel
Attorneys

Patented May 3, 1949

2,468,945

UNITED STATES PATENT OFFICE 2,468,945

ALTITUDE RESPONSIVE CONTROL AND SIGNAL DEVICE

John D. Sasser, Springfield, Ohio, assignor to The Steel Products Engineering Company, Springfield, Ohio, a corporation of Ohio Application July 21, 1944, Serial No. 546,027

7 Claims. (Cl. 177—311)

This invention relates to altitude responsive controls.

It is the principal object of the invention to provide a control responsive to altitude or to a similar pressure condition, which is simple and inexpensive in construction, and accurate and reliable in operation such that it is suitable for use in aircraft and the like for giving an indication or actuating a control element in response to a predetermined altitude of the aircraft.

It is a further object to provide such a control which can be readily adjusted to function at a predetermined altitude or pressure condition and the operation of which may be easily checked at any altitude or pressure.

It is a still further object to provide such a control which may be interchangeably actuated from a self-contained source of power such as a battery, or from an external power source, the conversion being accomplished readily and without use of special tools.

Other objects and advantages will be apparent from the following description, the accompanying drawing, and the appended claims.

In the drawing,

Fig. 1 is a plan view with the housing cover removed showing a control constructed in accordance with the present invention;

Fig. 2 is an end elevational view of the control with certain parts being broken away to more clearly show the construction;

Fig. 3 is a side elevational view with other parts broken away to show the construction of the sealed bellows and switch operating mechanism;

Fig. 5 is a schematic circuit diagram of the control;

Figure 6:
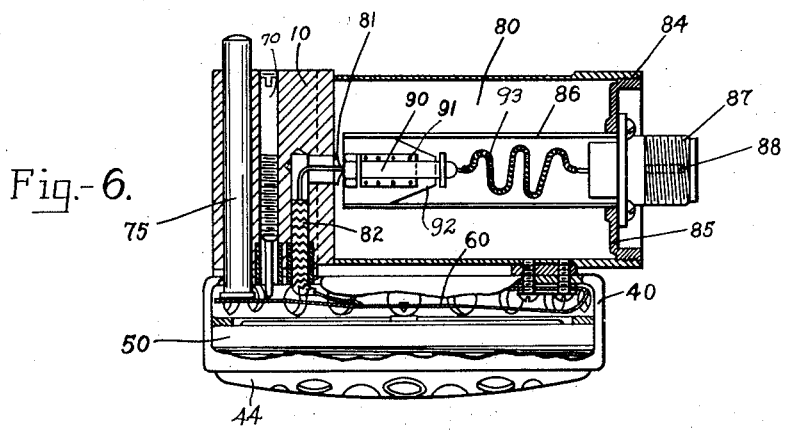
Fig. 6 is a sectional view of a modified construction showing a convertible control in condition for energization from an external power source.

In order to illustrate the construction and operation of the control of the present invention, reference will be made hereinafter to the application of such control for use on aircraft, with the control being responsive to changes in atmospheric pressure, thereby providing a circuit control means which responds to the particular atmospheric pressure or altitude of the aircraft. There are various operations or controls which it may be desired to actuate on an aircraft in accordance with a predetermined altitude condition, and the present device provides a control which responds to a definite altitude, the altitude being capable of being predetermined so that the control can be set to respond to a wide range of pressure conditions. The control provides accurate response to a definite preselected altitude, that response being maintained throughout its use, and being capable of being reset and again maintained with a high degree of accuracy, so that the control while simple and light in weight has great reliability.

As examples of aircraft functions which are dependent upon altitude, it may be desired to provide for the automatic raising of landing gear in response to the rising of the aircraft to a predetermined altitude, so that the pilot is not required to perform this function himself. As another example, in the case of an aircraft having provision for supplying pressure to an enclosed chamber such as a cabin or a turret, it is often found that the occupant does not immediately sense the need for such pressure supply until his faculties have been somewhat dulled as a result of inadequate oxygen. In accordance with the present control, an indication may be given at the time when the additional supply should be introduced, or the control may itself automatically provide for such introduction. The control is similarly applicable to other conditions, for either initiating or terminating a signal or causing a definite operation to take place either in response to a predetermined increase or decrease in the altitude of the aircraft, and hence in response to the pressure condition which exists in the vicinity of the control.

Referring to the drawing which discloses a preferred embodiment of the invention, the control as shown comprises a housing indicated at 10 which is generally L-shaped in plan as shown in Fig. 1, and which has a hollow interior for receiving the electrical control mechanism. The housing is provided with a cover 11 which is removably held in place by means of nuts 12 received over bolts 13 fastened in the base of the housing.

At one side, the housing has a projecting part 15 to which there is secured the electrical fitting 16 which may be of conventional construction, incorporating an outer threaded sleeve 17 and a pair of spaced interior contact members 18, 19. This electrical fitting is adapted to be connected with the standard cooperating fitting in the usual manner for the supply of power to the control, and for the delivery of the control power to the particular load device.

Terminals 18 and 19 are connected respectively to binding posts 20 and 21 which are suitably mounted within the housing and to which are respectively connected the bracket members 22, 23 the upper ends of which form fixed contacts 24, 25. A movable contact assembly 26 is adapted to bridge across and thus close the circuit between contacts 24 and 25, and is carried on a pivotally mounted assembly 28, fulcrumed about the stops 29 and spring urged to open position by means of tension spring 30. The assembly 28 also carries an armature 32 which is mounted in position above a solenoid 33, so that in response to the actuation of the solenoid, the armature will be actuated and will move downward against the force of spring 30 to close the contacts upon each other and thus complete the circuit from terminal 18 to terminal 19.

The housing also provides for mounting a lamp socket 35 within which there is received a small lamp 36 which is located beneath an opening in the housing covered by a jewel 37. Thus in response to the energizing of the lamp 36, a brilliant signal will be shown, and as a result of the use of the jewel construction shown, that signal will be visible from substantially all angles.

In order to provide the pressure or altitude responsive function, a casing assembly is provided comprising a fixed casing member 40 which is suitably bolted to the outer surface of housing 13. Such casing is formed with an inwardly projecting flange 41 and with an outwardly extending part 42 which is threaded internally as clearly shown in Fig. 3. A cooperating casing member 44 of generally circular shape has a flanged portion 45 which is threaded so as to cooperate with and be removably received within the threaded part 42.

Between the two sections of the casing assembly there is received a pressure responsive bellows as shown at 50. This bellows comprises a relatively smooth back plate or disk 51 to which there is secured the forward plate or disk 52 which as shown is ribbed or corrugated with circular corrugations. This construction provides for a relatively stiff back plate, and a relatively flexible forward plate. The two plates are joined and sealed together, either by welding, or by soldering, or in some other suitable way so that the space enclosed between the two disks is hermetically closed and permanently sealed. It is not necessary to establish any particular pressure condition within this space, either above or below atmospheric, and the assembly can be conveniently formed and sealed under normal atmospheric conditions.

An actuating pin and contact 54 is secured to the center of the flexible disk 52, at the point which develops the greatest travel in response to pressure change. In its assembled form, the bellows is received within the casing, the outer casing member 44 providing for securely clamping the bellows against flange 41, while at the same time leaving the flexible disk 52 free to yield and move under pressure changes. Preferably the casing members are made of relatively light weight material and may be provided with a series of openings shown at 56 for the purpose of reducing the weight of the device.

A cooperating and relatively fixed contact member is carried by the inner casing member 40, and comprises a flexible spring element 60 forming a contact carrying blade one end of which is bent back upon itself as shown at 61, providing a support through which fastening bolts 62 extend. The spring arm 60 is suitably insulated from the casing by means of an insulating washer 64. A contact point 65 is mounted on the arm 60 in position to engage the pin 54 carried on flexible disk 52, this contact thus being insulated with respect to the grounded frame. Suitable electrical connection is made to the arm by insulated conductor 66 connected to one side of the solenoid 33.

The arm is so bent as to tend normally to spring upward away from contact 54 in the position shown in Fig. 3, thereby tending to open the circuit at contact 65. The position of the arm and hence the initial spacing between contacts 54 and 65 is determined by means of a pin 67 which is insulated from the housing by means of sleeve 68 and which engages the end of the spring arm remote from its support. To assure that the pin will not form a conduction path between arm 60 and the grounded side of the line, it may be made of insulating material or the material of which the housing is formed may be of wood or molded plastic, or other insulating means may be used. Pin 67 has a threaded part 69 and has a screw driver slot 70 which is accessible at its upper end so that it can be adjusted, and thereby move the spring arm 60 either closer to or farther from the contact member 54. It will thus obviously require a greater or less travel of the contact 54 before the circuit is closed upon contact 65, and hence the altitude and pressure at which the switch will close may be predetermined. Because of the accuracy with which the pin 67 can be adjusted, and further because its movement is approximately double the travel of the central part of the arm, it is possible to locate the contact 65 with considerable accuracy, and also to maintain that location throughout the operation of the device.

It is desirable to provide for the manual actuation of the device irrespective of the response of the pressure sensitive part. For this purpose a manually operable pin 75 is mounted in the housing, having an enlarged head 76 which engages the end of the spring arm 60, so that when manually depressed, the arm is moved downwardly to close contact 65 upon contact 54. Member 75 may conveniently be made of an insulating moulded material which is light in weight such that it does not affect the desired accuracy of response of the control.

The circuit is as shown in Fig. 5 where the ship's supply of power is indicated as being connected to terminal 18, this in turn being connected directly to contact 20. The movable contact assembly 26 is adapted to close the circuit to the contact 21 when solenoid 33 is energized and thus to supply power through terminal 19 to the load. The lamp 36 is also connected to terminal 21, the opposite side of the lamp being grounded to complete the circuit. Solenoid 33 has one of its terminals connected to contact 20, while the other is connected through wire 66 to contact 65. The contact 54 being mounted on the uninsulated portion of the casing is grounded, and in response to the closing of the switch contacts 54 and 65, the energizing circuit for the solenoid is completed to thus close the main contacts, lighting the lamp, and also supplying power to the load device. If only the signal function is desired, then the load need not be connected, and the device will function to give a visual or other indication in response to the closing and opening of the pressure switch. The operation of the manual control 75 will cause the operation of the device at any time and provides a convenient check on the functioning thereof.

Figure 7:
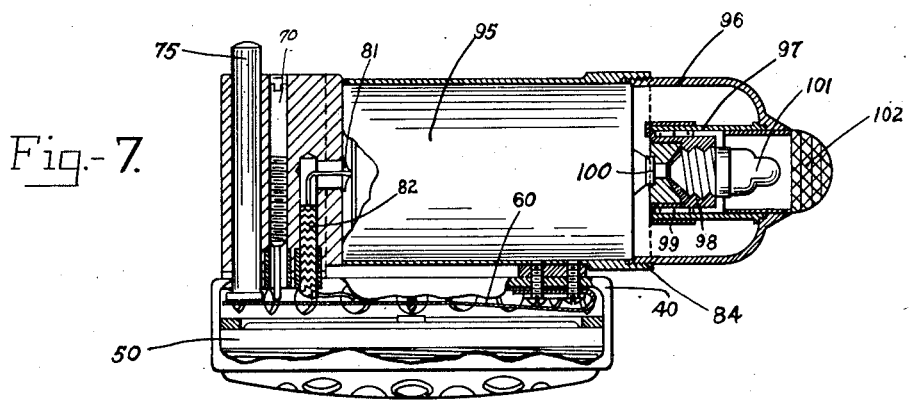
Fig. 7 is a view of the same control shown in Fig. 6 but adapted to be self-energized, as from a battery.
Figure 4:
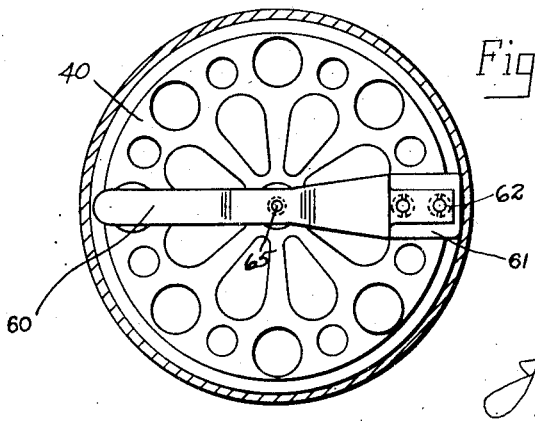
Fig. 4 is a sectional view through the supporting casing showing the mounting of the adjustable switch contact.

In the modified construction shown in Figs. 6 and 7, the same construction of housing 10, casing 40 and pressure bellows 50, with its associated contact and adjusting mechanism is provided as already described. However in this form provision is made for a convertible control which may be either operative from a self-contained source of power such as a battery, or arranged for operation from an external source of power. For this purpose the relay and the switch mechanism described above are not used, and the housing is provided with an opening 80 at the inner end of which there is received the stationary contact member 81 suitably connected by wire 82 to the flexible switch arm 60. The outer end of the housing has a threaded part indicated at 84, and this is adapted to engage threads on a dish-shaped member 85 to which is bolted a cylindrical fitting 86. The outer end of such fitting is threaded as shown at 87 and an internal contact member 88 is provided which can be engaged in a standard cooperating fitting for connection to a power source in the ordinary manner.

Yieldably mounted contact 90 is carried in a frame 92 in the end of fitting 86, and is yieldably urged into circuit closed relation with the fixed contact 81 by spring 91, a connecting wire 93 establishing the connection between the insulated contact 90 and the terminal 88. In this case the signal device may be located in the line from the power source, such that in response to the closing of the pressure switch, that circuit will be grounded and an appropriate signal or other control operation thus provided.

Fig. 7 shows the same device when arranged for self-energization. In this case the fitting 86 is removed, by unthreading the sleeve 85, whereupon the entire fitting is directly withdrawn. It may be replaced by a dry cell battery 95, the case of which contacts the stationary contact 81 when it is in assembled position. In order to close the opening in the housing, a closure member 96 is provided which is also threadedly received on the threaded portion 84 and which embodies a central sleeve 97 which carries a yieldably actuated lamp base or socket 98, with a spring 99 acting to maintain the base contact 100 in electrical contact with the central terminal of the battery. Lamp 101 is mounted in the socket beneath a jewel 102 so that in response to the energization of the lamp, a signal is thereby provided.

The operation of this device will be evident from the foregoing, the pressure switch being responsive in the same manner as already described. Further, particularly in the case of the battery operated control, it is desirable that the occupant of the space be able to test the control at atmospheric pressure to make certain that the battery is alive and that the control is operative. This is conveniently done by actuating the manual control 75, and assurance is thus provided so that the occupant may then give no further attention to the device until, as the aircraft rises resulting in the illumination of the signal light he is notified that the proper altitude has been reached for which the control is set, and will thus not inadvertently overlook the performance of the desired function.

The device is extremely simple and compact in construction, inexpensive in manufacture, light in weight and of rugged construction making it well adaptable for aircraft use. Further it has been found to have a high degree of accuracy such that it can be preset for a desired altitude with the assurance that it will function accurately and repeatedly at that particular altitude throughout repeated flights.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An altitude responsive control which comprises a permanently closed and sealed bellows having a part thereof movable in response to changes in atmospheric pressure, contact means carried by said movable part, cooperating fixed contact means for closing a circuit with said movable contact means upon a predetermined movement of said bellows, and auxiliary means for closing said circuit between said contacts to test said circuit independently of the movement of said movable contact means.

2. An altitude responsive control which comprises a closed and sealed bellows having a part thereof movable in response to changes in atmospheric pressure, electric circuit control means including a pair of relatively movable cooperating contacts closable upon a predetermined movement of said bellows, an electrically operated device adapted to be energized when said contacts are closed, and an auxiliary manually operable means for closing said circuit between said contacts independently of the movement of said bellows to test said device.

3. An altitude responsive control comprising a housing, a battery mounted within said housing, a closed and sealed bellows having a part thereof movable in response to changes in atmospheric pressure, a signal device carried on said housing, a switch contact carried on said movable bellows part, a relatively fixed contact supported from said housing and adapted to close a circuit with said movable contact from said battery to said signal device in response to movement of said movable contact, and auxiliary control means for manually closing said circuit through said contacts independently of atmospheric pressure to test said battery and signal device.

4. An altitude responsive control comprising a housing, a closed and sealed bellows having a part thereof movable in response to changes in atmospheric pressure, a signal device carried on said housing, a switch contact carried on said movable part, a battery mounted within said housing and providing a self-contained source of energy for said control and signal device independent of external power sources, a relatively fixed contact supported from said housing and adapted to close a circuit with said movable contact from said battery to said signal device in response to movement of said movable contact, means for setting said fixed contact in different positions relative to said bellows to provide for the closing of said contacts at different atmospheric pressures, and auxiliary control means for manually closing said circuit through said contacts independently of atmospheric pressure to test said battery and signal device.

5. An altitude responsive control comprising a supporting frame, a closed and sealed bellows mounted on said frame and having a part thereof movable relative to said frame in response to changes in atmospheric pressure, an electrical contact carried by said movable bellows part, a normally stationary contact assembly comprising a resilient contact member, means for mounting one end of said assembly in fixed position upon said frame with said assembly extending transversely of said bellows and in operative relation with said movable contact, means for adjusting the position of the free end of said assembly to predetermine the spacing between said contacts to provide for closing and opening thereof at predetermined altitudes, and manually operable means in said housing for moving said resilient contact member into contact with said movable contact member independently of movement by said movable bellows part to test a circuit connected to said contacts.

6. An altitude responsive control comprising a recessed supporting frame, a closed and sealed bellows removably mounted in said frame recess and having a part thereof movable relative to said frame in response to changes in atmospheric pressure, an electrical contact member carried by said movable bellows part, a removable cap member supported from said frame for retaining said bellows in operative position in said recess providing for direct removal therefrom, a normally stationary contact assembly supported from said frame in operative relation with respect to said movable bellows part, said contact assembly including a resilient contact member positioned to be urged by its resiliency away from contact with said movable contact and providing for operation of said assembly in response to the movement of said bellows, and means for adjusting the position of said resilient contact member with respect to said frame and said movable contact member to predetermine the altitude at which said contact assembly is actuated by said bellows.

7. An altitude responsive control comprising, in combination, a housing, a member mounted in said housing and including a part movable in response to atmospheric pressure, an electrical contact member carried by said movable part, a relatively fixed electrical contact supported by said housing and adapted to close a circuit with said movable contact member upon movement by said movable part, switch means within said housing controlled by said circuit and adapted to be operated upon the closing of said circuit between said contact members to actuate external load means in accordance with changes in pressure, an electric signal device carried by said housing and connected to said circuit to be energized upon the closing of said circuit between said contact members to indicate operation of said switch means, and manually operable means carried by said housing for closing said circuit through said contacts independently of movement by said movable contact member to test said device.

JOHN D. SASSER.

REFERENCES CITED

The following references are of record in the file of this patent:

UNITED STATES PATENTS

| Number | Name | Date |
|---|---|---|
| Re. 22,272 | Price | Feb. 16, 1943 |
| 2,211,700 | Maynard | Aug. 13, 1940 |
| 2,248,878 | Kolsman | July 8, 1941 |
| 2,302,072 | Tickell | Nov. 17, 1942 |
| 2,315,137 | Shaw | Mar. 30, 1943 |
| 2,316,009 | Martin et al. | Apr. 6, 1943 |
| 2,316,411 | Finnigan | Apr. 13, 1943 |
| 2,358,425 | Tickell | Sept. 19, 1944 |
| 2,355,149 | De Giers | Aug. 8, 1944 |